Oct. 5, 1965  J. R. BARTOSH  3,210,062
CAMBER-RESTORING SPRING ASSEMBLY FOR A PIVOTED
MOTOR VEHICLE REAR WHEEL SUSPENSION
Filed Feb. 13, 1964  2 Sheets-Sheet 1
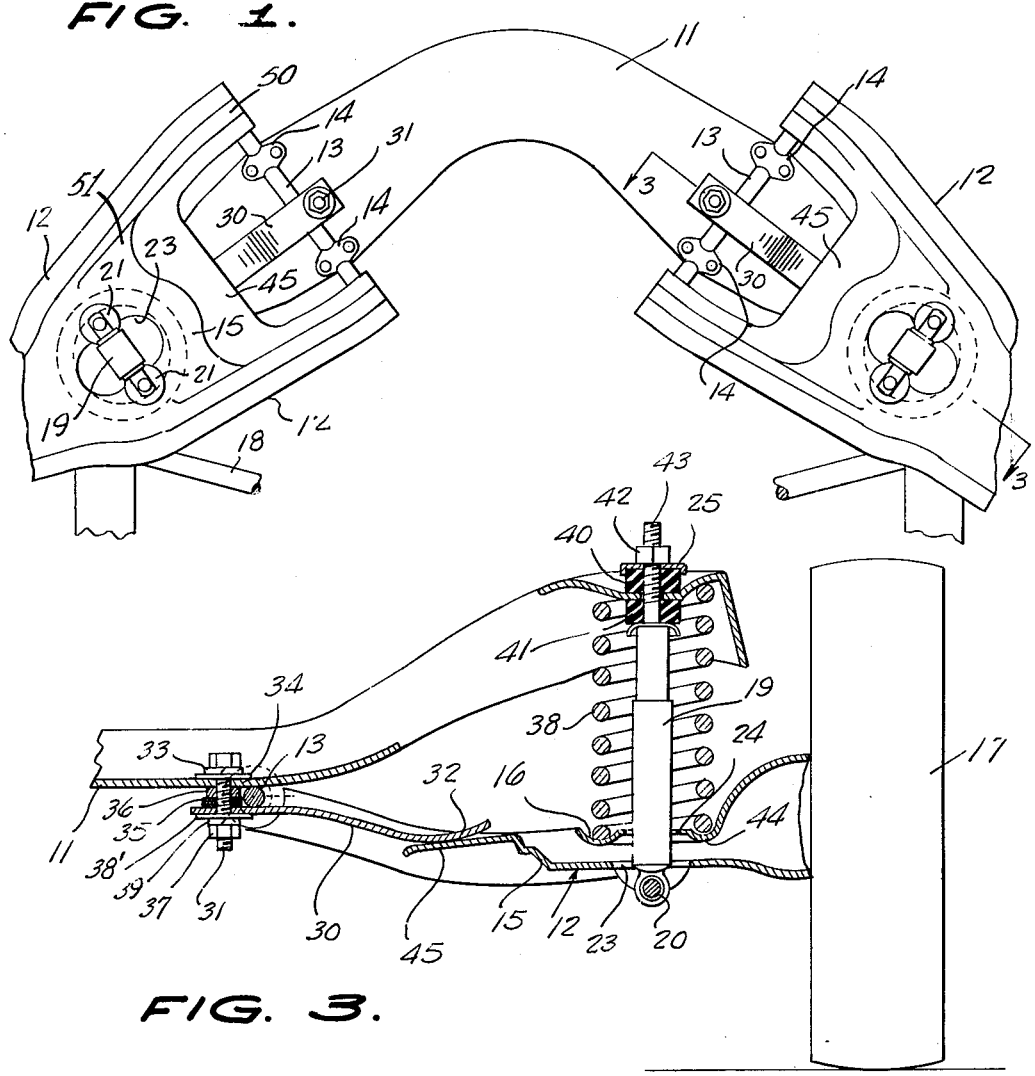
INVENTOR.
JOHN R. BARTOSH
BY
McMorrow, Berman + Davidson
ATTORNEYS.

Oct. 5, 1965   J. R. BARTOSH   3,210,062
CAMBER-RESTORING SPRING ASSEMBLY FOR A PIVOTED
MOTOR VEHICLE REAR WHEEL SUSPENSION
Filed Feb. 13, 1964   2 Sheets-Sheet 2
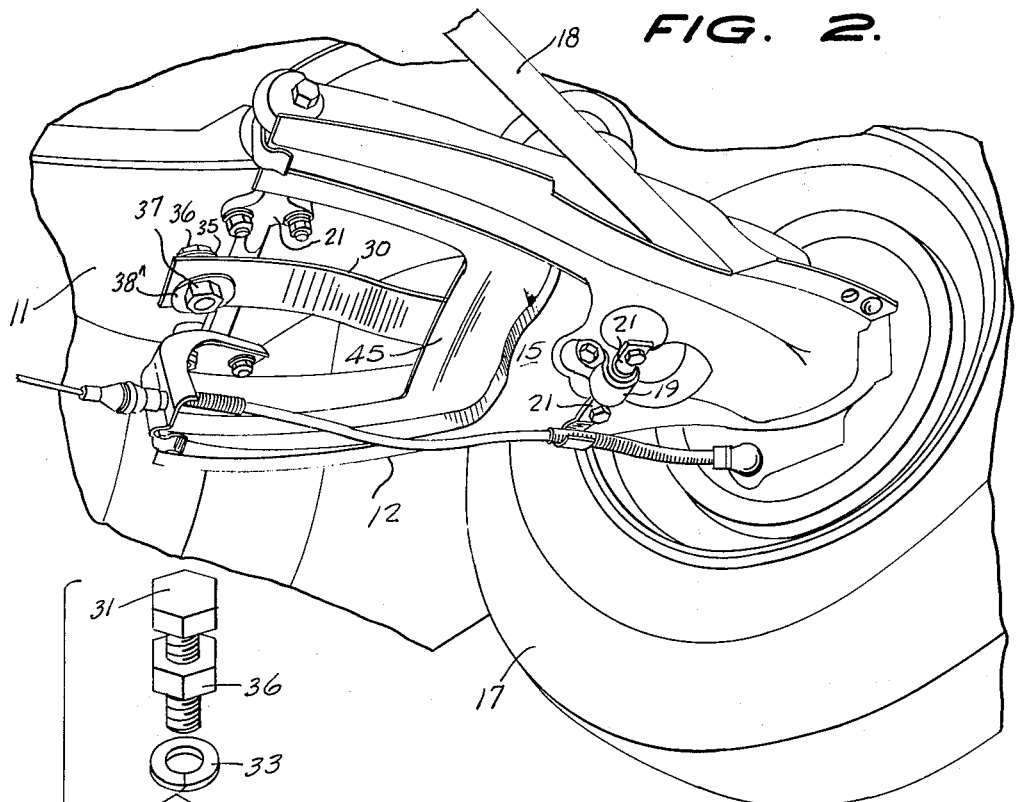
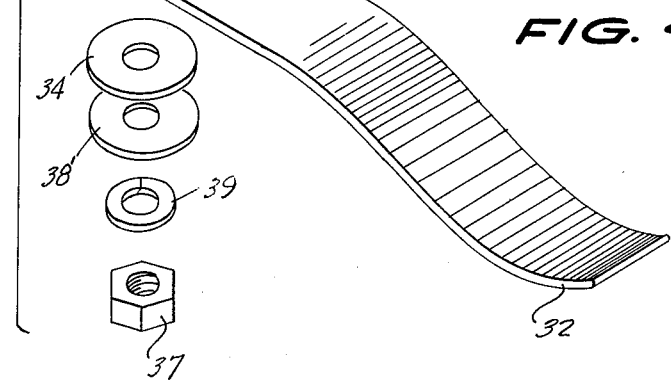
INVENTOR.
JOHN R. BARTOSH,
BY
McMorrow, Berman + Davidson
ATTORNEYS.

United States Patent Office 3,210,062
Patented Oct. 5, 1965

3,210,062
CAMBER-RESTORING SPRING ASSEMBLY FOR
A PIVOTED MOTOR VEHICLE REAR WHEEL
SUSPENSION
John R. Bartosh, 812 Washington Ave., Golden, Colo.
Filed Feb. 13, 1964, Ser. No. 344,665
4 Claims. (Cl. 267—16)

This invention relates to improvements in wheel suspensions for automotive vehicles, and more particularly to a leaf spring assembly for restoring the camber of a rear wheel in a vehicle employing a pivoted rear wheel suspension.

A main object of the invention is to provide a novel and improved motor vehicle rear wheel suspension assembly which involves relatively simple parts, which is easy to install, and which acts to preserve the proper camber for the associated rear wheel and to stabilize the rear wheel suspension assembly, as well as serving as an overload spring means.

A further object of the invention is to provide an improved reinforcing leaf spring to be employed with motor vehicles employing hollow rear wheel suspension arms of the pivoted type, the leaf spring being inexpensive to fabricate, being durable in construction, being easy to mount on a vehicle, and providing a downward biasing force on the associated suspension arm which restores the proper rear wheel camber, stabilizes the suspension assembly and also acts as a cushioning means to absorb heavy overloads.

Further objects and advantages of the invention will become apparent from the following description and claims, and from the accompanying drawings, wherein:

FIGURE 1 is a fragmentary bottom view of a portion of the main frame of an automotive vehicle of the type employing pivoted rear wheel suspension arms, illustrating the use of reinforcing leaf springs according to the present invention.

FIGURE 2 is a fragmentary bottom perspective view showing one of the suspension arms of FIGURE 1 and the reinforcing leaf spring associated therewith, in accordance with the present invention.

FIGURE 3 is an enlarged vertical cross sectional view taken substantially on the line 3—3 of FIGURE 1.

FIGURE 4 is an enlarged perspective view of a reinforcing leaf spring and associated fastening means, as employed in the structures illustrated in FIGURES 1, 2 and 3.

Referring to the drawings, 11 generally designates a stationary portion of the bottom of the main frame of an automotive vehicle, for example, of an automobile of the "Corvair" type which employs rear suspension arms 12, 12 pivoted to the main frame bottom portion 11 on substantially horizontal, rearwardly and inwardly inclined axes, namely, on substantially horizontal rearwardly and inwardly inclined shafts 13, 13 which are suitably secured to the main frame portion 11 at 14, 14.

As shown in FIGURE 3, the suspension arms 12 comprise main bodies 51 provided with bottom wall portions 15 and top wall portions 16 each main body having side extensions 50, 50 pivoted to its shaft 13, each rear wheel 17 being suitably journaled to the end of its suspension arm and being driven by a driving shaft 18 connected thereto by suitable universal joint means, not shown, and similarly connected to the differential output shaft of the associated vehicle.

Each suspension arm 12 is resiliently connected to the main frame member 11 by a shock absorber 19 pivoted on a transverse shaft 20 mounted between brackets 21, 21 secured to the bottom wall 15 of the suspension arm, the shock absorber extending upwardly through apertures 23 and 24 provided respectively in bottom wall 15 and top wall 16 and projecting through the wall of the main frame member 11, being provided at its top end with a downwardly flanged washer 25 and with rubber grommets 40 and 41 above and below member 11. A lock nut 42 is provided on the threaded top stud 43 of the shock absorber above washer 25. A large coiled spring 38 surrounds the shock absorber 19, bearing between the bottom surface of member 11 and an annular seat 44 formed in bottom wall 15 of the suspension arm. The coiled spring 28 is intended to provide the main resilient support for the suspension arm 12, but in many cases is inadequate or loses its resiliency, due to fatique or other physical changes in the material of which it is made. As a result of such deterioration, the associated rear wheel 17 becomes incorrectly positioned, namely, has incorrect camber, and the suspension assembly loses a considerable amount of its shock-absorbing ability, thus reducing the smoothness of action of the suspension arm assembly and causing incorrect tread wear.

In accordance with the present invention, reinforcing spring means is employed to restore the camber in the rear wheels 17, to stabilize the rear suspension assemblies, and also to serve as cushioning means to absorb sudden and heavy overloads imposed on the rear wheel suspension assemblies.

Thus, a heavy leaf spring 30 is secured to each side of the main frame member 11, for example, by a bolt 31 located inwardly adjacent to the mid portion of a shaft 13, the secured end of the leaf spring underlying and being subjacent to the shaft 13, the leaf spring extending perpendicularly to the shaft, as shown in FIGURE 1. The leaf spring is of substantial length, being at least one-third the length of the associated suspension arm 12 and extends inwardly into overlying engagement with the elevated inner end flange 45, located between the side extensions 50, 50, of the bottom wall 15 of the suspension arm, the leaf spring having an arcuately curved end bearing portion 32 having a downwardly convex bearing surface which engages on the inner end flange 45 of the suspension arm, exerting substantial downward spring force thereon. As shown in FIGURE 3, the bolt 31 associated with each leaf spring 30 extends through the bottom wall of the main frame member 11, a lock washer 33 being provided under the head of the bolt and a large bearing washer 34 being provided between the lock washer 33 and the member 11. A spacer nut 36 is provided on the bolt and a shim pack 35 may be interposed between the nut 36 and the member 30. The bolt extends through the leaf spring 30, and is provided at its lower end with a fastening nut 37, a large washer 38' and a lock washer 39 being preferably employed between the fastening nut 37 and the leaf spring 30, as shown in FIGURE 3.

As shown in FIGURE 3, the elements are arranged so that the secured end of the leaf spring 30 extends parallel to the bottom wall of the frame member 11, passing beneath the associated shaft member 13 in perpendicular relationship thereto. The leaf spring is curved arcuately and downwardly so that its bearing portion 32 engages the inner end flange 45 of the suspension arm, as above mentioned, and exerts resilient downward force thereon.

With the leaf springs 30, 30 thus installed, the proper camber is restored to the rear wheel 17 and is maintained, and the rear suspensoins are reinforced and stabilized as well as provided with additional capacity to sustain sudden and heavy overloads. The camber may be accurately adjusted by employing the required number of shims in the shim pack 35.

While a specific embodiment of an improved means for reinforcing the rear wheel suspension arms of automotive vehicles has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an automotive vehicle having a main frame, a rear wheel suspension arm pivoted to said main frame for rotation on a substantially horizontal rearwardly and inwardly inclined axis, said suspension arm comprising a main body having a pair of side extensions pivoted to said main frame at their inner ends, said main body extending outwardly for a substantial portion of the length of the arm toward its free outer end, said main body having spaced top and bottom walls, the bottom wall being provided between said side extensions with an inner end flange, a rear wheel journaled on the free outer end of said suspension arm, and a leaf spring secured to said main frame adjacent said axis and extending outwardly, said leaf spring having a free end portion bearing downwardly on said inner end flange of the bottom wall.

2. In an automobile vehicle having a main frame, a rear wheel suspension arm pivoted to said main frame for rotation on a substantially horizontal rearwardly and inwardly inclined axis, said suspension arm comprising a main body having a pair of side extensions pivoted to said main frame at their inner ends, said main body extending outwardly for a substantial portion of the length of the arm toward its free outer end, said main body having spaced top and bottom walls, the bottom wall being provided between said side extensions with an inner end flange, a rear wheel journaled on the free outer end of said suspension arm, and an outwardly extending leaf spring secured to said main frame adjacent said axis and extending substantially perpendicular to and underlying said axis and having a free end portion bearing downwardly on said inner end flange of the bottom wall.

3. In an automotive vehicle having a main frame, a rear wheel suspension arm pivoted to said main frame for rotation on a substantially horizontal rearwardly and inwardly inclined axis, said suspension arm comprising a main body having a pair of side extensions pivoted to said main frame at their inner ends, said main body extending outwardly for a substantial portion of the length of the arm toward its free outer end, said main body having spaced top and bottom walls, the bottom wall being provided between said side extensions with an inner end flange, a rear wheel journaled on the free outer end of said suspension arm, and an outwardly extending leaf spring secured to said main frame adjacent said axis and extending substantially perpenciular to said axis, said leaf spring closely underlying said axis and being at least one-third the length of the suspension arm, the leaf spring resiliently engaging said inner end flange of the bottom wall of the main body and exerting downward spring force thereon.

4. In an automotive vehicle having a main frame, a rear wheel suspension arm pivoted to said main frame for rotation on a substantially horizontal rearwardly and inwardly inclined axis, said suspension arm comprising a main body having a pair of side extensions pivoted to said main frame at their inner ends, said main body extending outwardly for a substantial portion of the length of the arm toward its free outer end, said main body having spaced top and bottom walls, the bottom wall being provided between said side extensions with an inner end flange, a rear wheel journaled on the free outer end of said suspension arm, a leaf spring, and bolt means securing one end of the leaf spring to said main frame in a position inwardly adjacent and underlying said axis, said leaf spring extending outwardly substantially perpendicular to said axis and having its free end bearing downwardly on said inner end flange of the bottom wall of said main body, said leaf spring being at least one-third the length of the suspension arm.

References Cited by the Examiner

UNITED STATES PATENTS

| 2,202,918 | 6/40 | Peo et al. | 267—19 |
| 2,603,481 | 7/52 | Wolze | 267—16 |
| 2,695,168 | 11/54 | Westra | 267—16 |
| 2,707,100 | 4/55 | Schilberg | 267—20 |
| 2,839,293 | 6/58 | Cover | 267—15 |
| 2,988,162 | 6/61 | Hansen | 180—73 |
| 3,123,348 | 3/64 | Hildebrandt | 267—20 X |

FOREIGN PATENTS 1,250,993  12/60  France.

MILTON BUCHLER, *Primary Examiner.*

KENNETH H. BETTS, *Examiner.*